United States Patent
Filho et al.

(10) Patent No.: US 12,208,455 B2
(45) Date of Patent: Jan. 28, 2025

(54) ROTARY CUTTING TOOL WITH ENHANCED COOLANT DELIVERY

(71) Applicant: Kennametal Inc., Latrobe, PA (US)

(72) Inventors: Ruy Frota de Souza Filho, Latrobe, PA (US); Xiangdong D. Fang, Greensburg, PA (US); Iranna Shidrameshetra, Karnataka (IN)

(73) Assignee: KENNAMETAL INC., Latrobe, PA (US)

( * ) Notice: Subject to any disclaimer, the term of this patent is extended or adjusted under 35 U.S.C. 154(b) by 728 days.

(21) Appl. No.: 17/347,756

(22) Filed: Jun. 15, 2021

(65) Prior Publication Data
US 2021/0316376 A1     Oct. 14, 2021

Related U.S. Application Data

(62) Division of application No. 16/547,017, filed on Aug. 21, 2019, now abandoned.

(51) Int. Cl.
*B23B 51/06*     (2006.01)
*B23B 51/02*     (2006.01)
*B23C 5/28*     (2006.01)

(52) U.S. Cl.
CPC .............. *B23B 51/06* (2013.01); *B23B 51/02* (2013.01); *B23B 2250/12* (2013.01);
(Continued)

(58) Field of Classification Search
CPC ... B23B 51/0686; B23B 51/068; B23B 51/06; B23B 2250/12
See application file for complete search history.

(56) References Cited

U.S. PATENT DOCUMENTS

| 1,454,452 | A | * | 5/1923 | Moore | .................... B23B 51/06 408/59 |
| 4,059,031 | A |   | 11/1977 | Erdely et al. | |

(Continued)

FOREIGN PATENT DOCUMENTS

| CN | 103223502 A | 7/2013 |
| CN | 105050758 A | 11/2015 |

(Continued)

OTHER PUBLICATIONS

English translation of WO 2018166889 (Year: 2018).*
(Continued)

*Primary Examiner* — Alan Snyder
(74) *Attorney, Agent, or Firm* — Christopher J. Owens

(57) ABSTRACT

A rotary cutting tool includes a main body, a shank portion having a rearward end, and a flute portion having a forward end with one or more flanks. One or more connecting fluid holes are in fluid communication with a central fluid hole and terminates at a flank at the forward end of the cutting tool. One or more twisted fluid holes extend through a lobe in the flute portion and terminates at a flank at the forward end of the cutting tool. A cross-sectional shape of the connecting fluid holes and the twisted fluid holes is selected to provide enhanced delivery of fluid to the cutting edge. In one aspect, the rotary cutting tool is a modular drill and the flute portion has a pocket for holding a replaceable cutting insert.

10 Claims, 10 Drawing Sheets

(52) U.S. Cl.
CPC ........... *B23B 2251/408* (2013.01); *B23C 5/28* (2013.01); *Y10T 408/455* (2015.01)

(56) References Cited

U.S. PATENT DOCUMENTS

| | | | |
|---|---|---|---|
| 4,826,364 | A | 5/1989 | Grunsky |
| 4,813,823 | A | 11/1989 | Bieneck et al. |
| 5,676,499 | A | 10/1997 | Tukala |
| 6,045,301 | A | 4/2000 | Kammermeier et al. |
| 8,251,621 | B2 | 8/2012 | Kammermeier |
| 8,721,235 | B2 | 5/2014 | Luik et al. |
| 8,753,046 | B2 | 6/2014 | Shnajder et al. |
| 8,998,543 | B2 | 4/2015 | Schwenck et al. |
| 9,216,460 | B2 | 12/2015 | Yanagida et al. |
| 9,302,332 | B2 * | 4/2016 | Scanlon ................. B23B 51/06 |
| 9,498,829 | B2 | 11/2016 | Zabrosky |
| 9,539,652 | B2 | 1/2017 | Zimmermann et al. |
| 9,623,489 | B2 | 4/2017 | Guter |
| 9,623,490 | B2 | 4/2017 | Takai |
| 9,636,756 | B2 | 5/2017 | Riester |
| 9,700,944 | B2 | 7/2017 | Schwagerl et al. |
| 9,795,457 | B2 | 10/2017 | Friedrichs |
| 10,369,636 | B2 | 8/2019 | Ach et al. |
| 2008/0260479 | A1 | 10/2008 | Kammermeier |
| 2010/0150673 | A1 | 6/2010 | Schneider et al. |
| 2010/0266357 | A1 | 10/2010 | Kretzschmann et al. |
| 2011/0268518 | A1 | 11/2011 | Sampath et al. |
| 2012/0082524 | A1 | 4/2012 | Matsuda et al. |
| 2012/0114438 | A1 | 5/2012 | Schwenck et al. |
| 2013/0223943 | A1 * | 8/2013 | Gey ........................ B23B 51/02 408/199 |
| 2013/0302748 | A1 | 11/2013 | Friedrichs |
| 2014/0255115 | A1 | 9/2014 | Zabrosky |
| 2014/0255116 | A1 * | 9/2014 | Myers .................... B23B 51/06 408/59 |
| 2015/0321267 | A1 | 11/2015 | Takai |
| 2015/0360302 | A1 | 12/2015 | Guter |
| 2016/0031016 | A1 | 2/2016 | Takai |
| 2016/0059323 | A1 | 3/2016 | Riester |
| 2017/0072477 | A1 | 3/2017 | Bitzer et al. |
| 2018/0133809 | A1 | 5/2018 | Brunner |
| 2018/0236568 | A1 | 8/2018 | Yamamoto et al. |
| 2019/0143423 | A1 * | 5/2019 | Nakata .................... B23C 5/28 408/226 |
| 2021/0001438 | A1 * | 1/2021 | Royer .................... B33Y 80/00 |

FOREIGN PATENT DOCUMENTS

| | | |
|---|---|---|
| CN | 106073910 A | 11/2016 |
| CN | 206151605 U | 5/2017 |
| CN | 109153085 A | 1/2019 |
| DE | 4128028 A1 | 2/1993 |
| DE | 20219824 U1 | 4/2004 |
| DE | 202009002995 U1 | 5/2009 |
| DE | 102014108220 A1 | 12/2015 |
| DE | 202018104291 U1 | 7/2018 |
| DE | 102017208039 A1 | 11/2018 |
| EP | 2551045 A2 | 1/2013 |
| EP | 3459663 A1 | 3/2019 |
| GB | 191419371 A | 2/1915 |
| JP | 8215913 A2 | 8/1996 |
| JP | 2005262348 A2 | 9/2005 |
| JP | 2012200836 A2 | 10/2012 |
| JP | 2013193159 A | 9/2013 |
| KR | 101014027 B1 | 2/2011 |
| SU | 1276446 A2 | 12/1986 |
| WO | 2018/166889 A1 | 3/2018 |
| WO | 18065550 A1 | 4/2018 |
| WO | 18162185 A1 | 9/2018 |

OTHER PUBLICATIONS

Apr. 15, 2021 Advisory Action (PTOL-303) 1 US App. No. 20210053128A1.

Mar. 9, 2021 Final Office Action (US Only) US App. No. 20210053128A1.

Jan. 27, 2021 Office Action (non-US) DE App. No. 102020120922.3.

Oct. 13, 2020 Office action (3 months) (US Only) U.S. Appl. No. 16/547,017.

Oct. 27, 2023 Foreign Office Action Chinese Application No. CN202010708389, 21 Pages.

Apr. 14, 2023 Foreign Office Action Chinese Application No. CN202010708389, 27 Pages.

Apr. 24, 2023 Foreign Office Action Chinese Application No. CN202010708389.0, 21 Pages.

* cited by examiner

ROTARY CUTTING TOOL WITH ENHANCED COOLANT DELIVERY

FIELD OF THE INVENTION

In general, the invention relates to a rotating cutting tool, and more particularly, to a rotating cutting tool with a primary, central fluid hole and a secondary fluid hole for each flute, each hole having a cross-sectional shape that is selected for providing enhanced fluid delivery.

BACKGROUND OF THE INVENTION

Material removal operations can generate heat at the interface between the cutting insert and the workpiece. Typically, it is advantageous to provide coolant to the vicinity of the interface between the cutting insert and the workpiece.

Even though some prior art arrangements deliver coolant, it remains highly desirable to provide a rotary cutting tool, such as a drill, and the like, that delivers fluid in an efficient manner to the interface between the cutting tool and the workpiece without significantly altering the performance and properties, such as torsional stiffness, and the like, of the cutting tool.

Thus, there is a need to provide improved fluid flow without significantly altering the performance and properties of the rotary cutting tool.

SUMMARY OF THE INVENTION

The problem of improving fluid delivery in a rotary cutting tool is solved by providing a central fluid hole and one additional fluid hole for each flute, wherein the central fluid hole has a larger cross-sectional area than the twisted fluid hole in each flute.

The fluid flow rate can be substantially improved when fluid holes are strategically placed in areas of low stress. The method of the invention involves defining the central hole size and shape (round, elongated, tri-lobed) and then adding one or more holes for each flute that adapted in shape to low stress areas of the drill. The principles of the invention can be applied to modular or indexable drills by communicating the central, main fluid hole to the peripheral ones by means of cross holes or 3D printing. Additive manufacturing would also allow the principles of the invention to be applied to carbide drills.

In one aspect, a rotary cutting tool comprises a main body, a shank portion having a rearward end, and a flute portion having a forward end with one or more flanks. The flute portion has a plurality of flutes separated by lobes. The flute portion is integral and adjacent the shank portion in an axial direction of the main body. A central fluid hole extends along a central, rotational axis, RA, from the rearward end, through the shank portion, partly into the flute portion, and terminates at a predetermined distance, DT, from the forward end. One or more connecting fluid holes are in fluid communication with the central fluid hole and terminate at a flank at the forward end of the flute portion for supplying fluid to one or more cutting edges of the flute portion. One or more twisted fluid holes extend from the rearward end, through the shank portion, through a lobe in the flute portion, and terminate at a flank at the forward end of the flute portion for supplying fluid to one or more cutting edges of the flute portion. A cross-sectional area of the central coolant fluid hole is larger than a cross-sectional area of one or more of the twisted fluid holes. The central coolant fluid hole has a non-circular cross-sectional shape; and each of the twisted fluid holes has a non-circular cross-sectional shape.

In another aspect, a rotary cutting tool comprises a main body, a shank portion having a rearward end, and a flute portion having a forward end with one or more flanks. The flute portion has one or more flutes separated by lobes. The flute portion is integral and adjacent the shank portion in an axial direction of the main body. The flute portion including a pocket portion for holding a cutting insert. A central fluid hole extends along a central, rotational axis, RA, from the rearward end, through the shank portion, partly into the flute portion, and terminates at a predetermined distance, DC, from a base surface of the cutting insert. One or more connecting fluid holes are in fluid communication with the central fluid hole and terminate at a flank of the cutting insert for supplying fluid to one or more cutting edges of the cutting insert. One or more twisted fluid holes extend from the rearward end, through the shank portion, through a lobe in the flute portion, and terminate at a flank of the cutting insert for supplying fluid to one or more cutting edges of the cutting insert. A cross-sectional area of the central coolant fluid hole is larger than a cross-sectional area of one or more of the twisted fluid holes. The central coolant fluid hole has a non-circular cross-sectional shape; and each of the twisted fluid holes has a non-circular cross-sectional shape.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
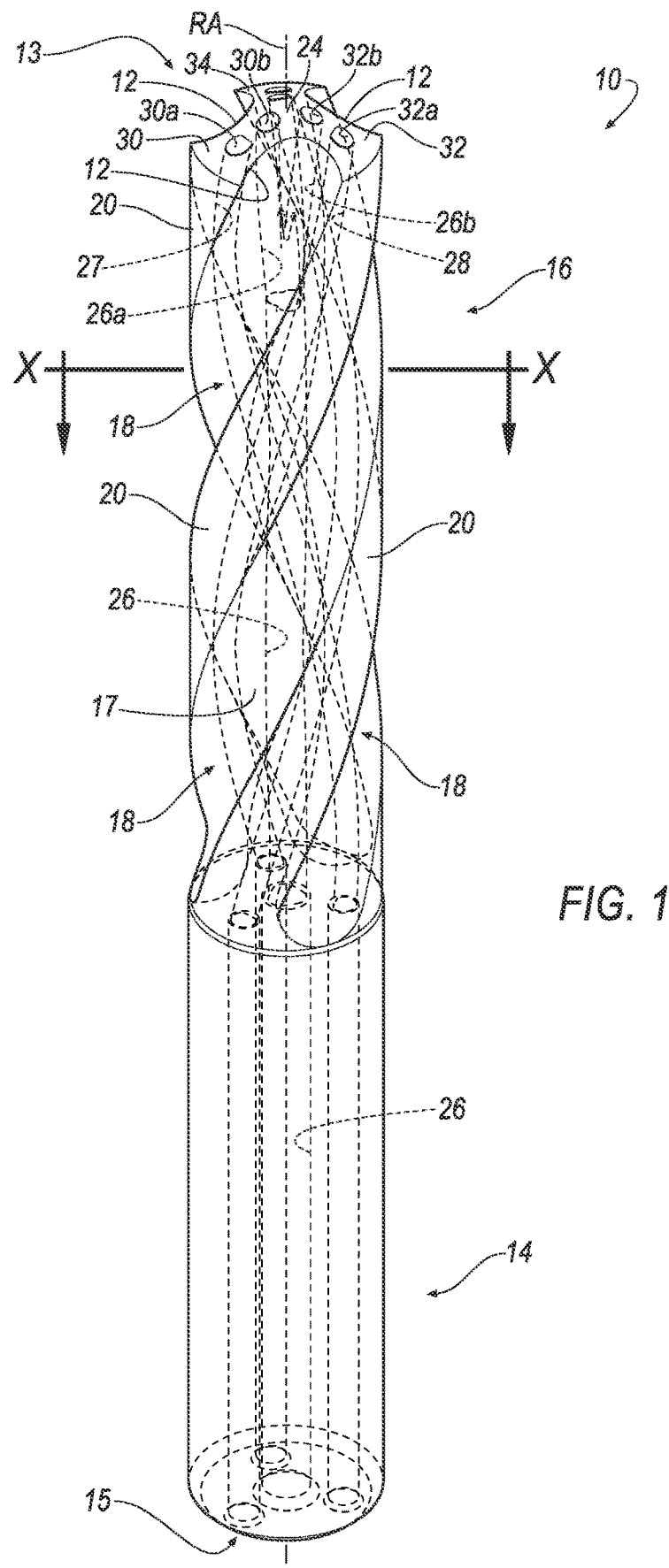
FIG. 1 is a front view of a rotary cutting tool, such as a drill with three flutes, according to an embodiment of the invention.

Referring now to FIGS. 1-4, a rotary cutting tool 10 is shown according to an embodiment of the invention. In the illustrated embodiment, the rotary cutting tool 10 comprises a drill 10 provided with three cutting edges 12 and three flutes 18. The drill 10 also includes a shank portion 14 having a rearward end 15 and a flute portion 16 having a forward end 13 that are integral and adjacent to each other in an axial direction of a main body 17. The forward end 13 of the drill 10 has a cutting tip 24.

Although the rotary cutting tool 10 comprises a drill in the illustrated embodiment, it should be appreciated that the principles of the invention can be applied to any desirable rotary cutting tool in which fluid is supplied between the cutting tool/workpiece interface.

The description herein of specific applications should not be a limitation on the scope and extent of the use of the cutting tool.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "elongate" is defined as something that is longer than it is wide. In other words, the width is smaller than its length.

As used herein, the term "triangular" is defined as an object having a shape like a triangle, i.e., a polygon having three sides and three corners.

As used herein, the term "circular" is defined as an object having a shape of a circle, i.e., an object having a simple closed shape. It is the set of points in a plane that are at a given distance from a given point, the center; equivalently it is the curve traced out by a point that moves in a plane so that its distance from a given point is constant. The distance between any of the points and the center is called the radius.

As used herein, the term "fluid" is defined as a substance that has no fixed shape and yields easily to external pressure, such as a gas or a liquid.

As used herein, the term "helical" is defined as pertaining to or having the form of a helix or spiral. A "helix" or "spiral" is defined as a curve in three-dimensional space formed by a straight line drawn on a plane when that plane is wrapped around a cylindrical surface of any kind, especially a right circular cylinder, as the curve of a screw. A circular helix of radius a and slope b/a (or pitch $2\pi b$) is described by the following parametrization:

$x(\theta) = a \sin \theta,$ $y(\theta) = a \cos \theta,$ $z(\theta) = b\theta.$ As used herein, the phrase "helix angle" is defined as the angle between any helix and an axial line on its right, circular cylinder or cone. The helix angle references the axis of the cylinder, distinguishing it from the lead angle, which references a line perpendicular to the axis. Thus, the helix angle is the geometric complement of the lead angle. The helix angle is measured in degrees.

As used herein, the term "3D printing" is any of various processes in which material is joined or solidified under computer control to create a three-dimensional object, with material being added together, such as liquid molecules or powder grains being fused together, typically layer by layer. In the 1990s, 3D printing techniques were considered suitable only to the production of functional or aesthetical prototypes and, back then, a more comprehensive term for 3D printing was rapid prototyping. Today, the precision, repeatability and material range have increased to the point that 3D printing is considered as an industrial production technology, with the official term of "additive manufacturing".

As used herein, the helix of a flute can twist in two possible directions, which is known as handedness. Most flutes are oriented so that the cutting tool, when seen from a point of view on the axis through the center of the helix, moves away from the viewer when it is turned in a clockwise direction, and moves towards the viewer when it is turned counterclockwise. This is known as a right-handed (RH) flute geometry, because it follows the right-hand grip rule. Flutes oriented in the opposite direction are known as left-handed (LH).

As used herein, the term "hole" is defined as an opening trough something; a gap; a cavity or an aperture that can have any cross-sectional shape.

As used herein, the term "triangle" is defined as a polygon with three sides and three vertices. An "equilateral" triangle is defined as a triangle in which all three sides are the same length.

Figure 2:
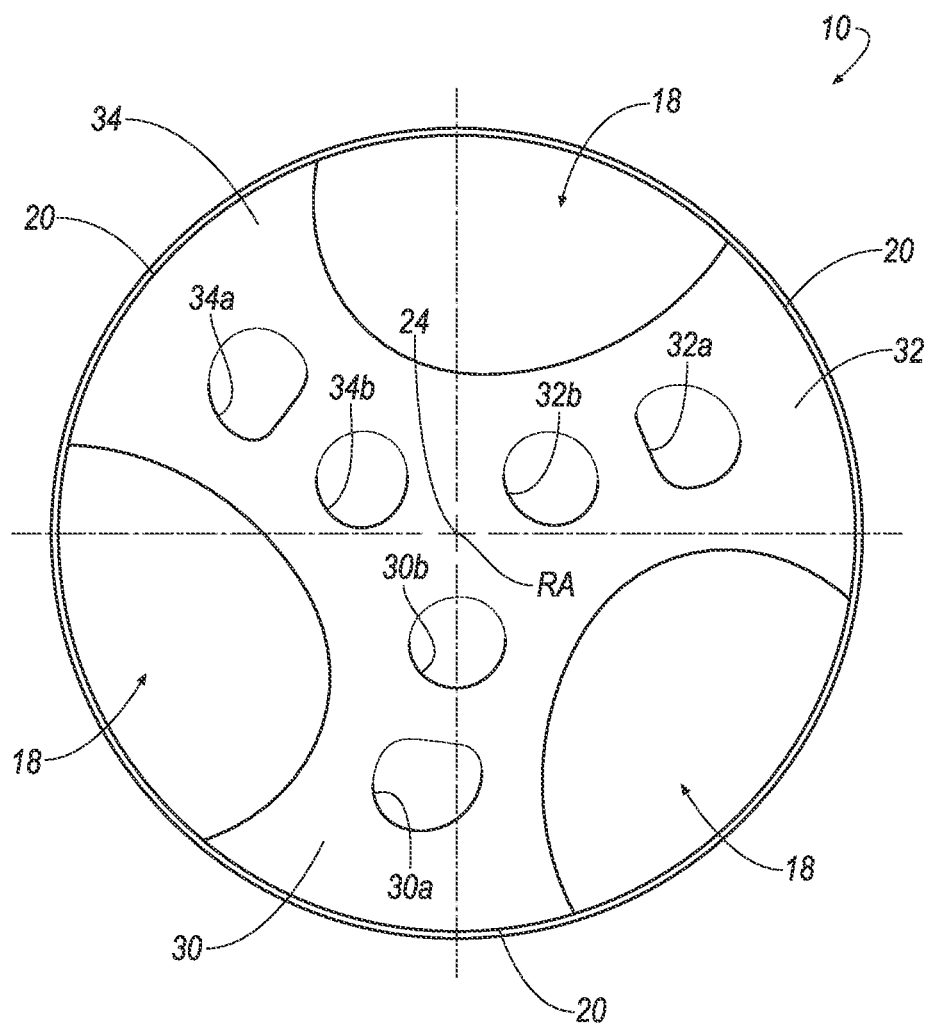
FIG. 2 is a top view of the three-flute drill illustrated in FIG. 1.
Figure 3:
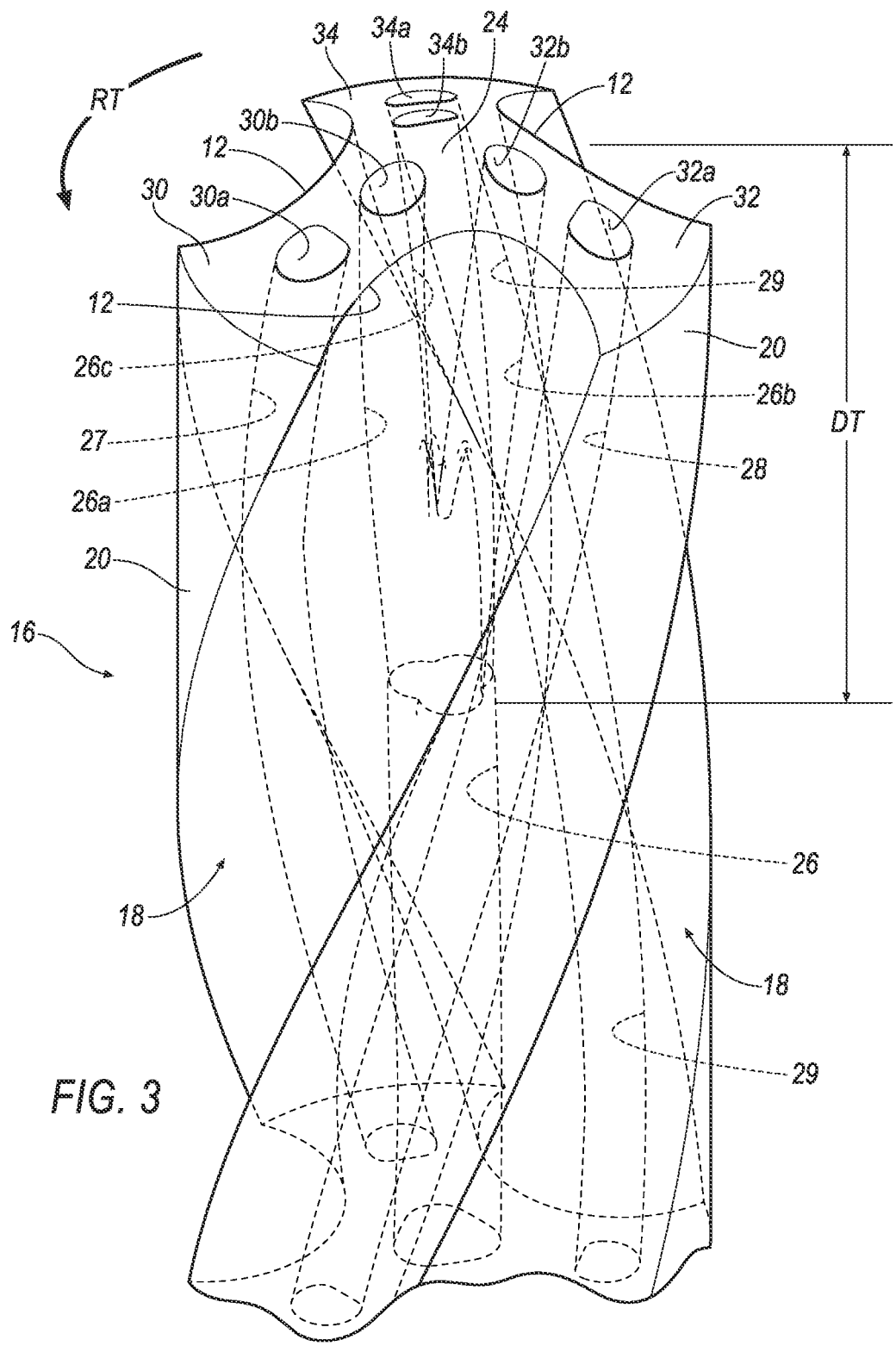
FIG. 3 is a partially enlarged view of a flute portion of the three-flute drill illustrated in FIG. 1 having a total of six openings in the three flank surfaces.

Referring now to FIGS. 1-3, the drill 10 is made of solid carbide and manufactured using a 3D printing process. However, it will be appreciated that the invention can be practiced with a drill made of any desirable material using any desirable manufacturing process. For example, the drill 10 can be made of a substrate of a super hard tool material, such as cemented carbide, and the like, and manufactured using a sintering process. In addition, intermetallic compounds, a diamond film, and the like, can be used as a hard film disposed on the substrate, for enhancing the cutting durability. For example, some suitable intermetallic compounds are metals of the groups Mb, IVa, Va, and VIa of the periodic table of the elements, for example, carbides, nitrides, and carbonitrides of Al, Ti, V, Cr, etc., or mutual solid solutions thereof and, specifically, TiAlN alloy, TiCN alloy, TiCrN alloy, TiN alloy, and the like, can be used. Although a hard film of such an intermetallic compound can be disposed by a PVD method, such as an arc ion plating, sputtering, and the like, the hard film may be disposed by another film formation method, such as a plasma CVD, and the like. Other suitable materials and manufacturing processes are encompassed by the principles of the invention.

The flute portion 16 is provided with a plurality of flutes 18 separated by lobes 20 for discharging chips generated by each of the cutting edges 12. In other words, the drill 10 is trilobed. The flutes 18 provided in the flute portion 16 are helical that twist clockwise around a central, rotational axis, RA, at a predetermined helix angle, HA, of about 30°, and are formed at positions point-symmetrical with respect to the central, rotation axis, RA. However, it will be appreciated that the invention is not limited by the magnitude of the helix angle, HA, and that the invention can be practiced with any desirable helix angle, HA, in a range between about greater than 0 degrees and about 75 degrees.

Although a three-flute drill is shown in the illustrated embodiment, it should be appreciated that the invention is not limited by the number of flutes and lobes, and that the principles of the invention can be practiced in a drill having any desirable number of flutes, such as two, four, five, six, and the like. Further, although the three-flute drill 10 in the illustrated embodiment has a drill diameter, D, of about 16 mm, the drill 10 may have a drill diameter of up to about 56 mm or may have two-stepped outer diameters (machining diameters).

One aspect of the invention is that the drill 10 can deliver an increased amount of fluid flow through the drill 10 to the interface between the drill 10 and the workpiece (not shown). Referring now to FIG. 2, the fluid can be supplied through an internal central fluid hole 26 and one or more twisted fluid holes 27, 28, 29. Each twisted fluid hole 27, 28, 29 has a spiral shape that can correspond to the path of the flutes 18. In addition, each twisted fluid hole 27, 28, 29 emerges in an opening (not shown) in the rearward end 15 of the drill 10 in fluid communication with a pressurized source of fluid (not shown).

As shown in FIG. 2, the central fluid hole 26 of the drill 10 extends along the rotational axis, RA, from the rearward end 15 of the drill 10, through the entire shank portion 14, partly into the flute portion 16, and terminates at some distance, DT, from the forward end 13 of the drill 10. At the distance, DT, the central fluid hole 26 branches or splits into one or more connecting fluid holes 26a, 26b, 26c in fluid communication with the central fluid hole 26. The central fluid hole 26 and the connecting fluid holes 26a, 26b, 26c can have any desirable cross-sectional shape, such as circular, non-circular, polygonal, and the like. For example, the central fluid hole 26 can be concentric with the rotational axis, RA, and having a circular cross-sectional shape in the shank portion 14 and a different cross-sectional shape, such as non-circular, polygonal, and the like, in the flute portion 16 of the drill 10.

In one embodiment, there is a one-to-one correspondence between the total number of connecting fluid holes 26a, 26b, 26c and the total number of flutes 18. Thus, in the illustrated embodiment, there are a total of three connecting fluid holes 26a, 26b, 26c; one connecting fluid hole 26a, 26b, 26c in each flute 18.

In addition, there is a one-to-one correspondence between the total number of twisted fluid holes 27, 28, 29 and the total number of flutes 18. Thus, in the illustrated embodiment, there are a total of three twisted fluid holes 27, 28, 29; one twisted fluid hole 27, 28, 29 in each flute 18, similar to the connecting fluid holes 26a, 26b, 26c. It should be noted that, in all embodiments of the invention, the connecting fluid holes 26a, 26b, 26c and the twisted fluid holes 27, 28, 29 have a smaller cross-sectional area than the central fluid hole 26.

As shown in FIGS. 2 and 3, the forward end 13 of the drill 10 includes three flanks 30, 32 and 34. In this illustrated embodiment, each of the connecting fluid holes 26a, 26b, 26c and each of the twisted fluid holes 27, 28, 29 emerges in an opening in each flank 30, 32, 34. Specifically, the twisted fluid holes 27, 28, 29 emerge into openings 30a, 32a, 34a in the flanks 30, 32, 34, respectively. Similarly, connecting fluid holes 26a, 26b, 26c emerge into openings 30b, 32b, 34b in the flanks 30, 32, 34, respectively.

Each connecting fluid hole 26a, 26, 26c may extend in a linear or curved fashion from the central fluid hole 26 to its respective opening 30b, 32b, 34b. Alternatively, the connecting fluid holes 26a, 26b, 26c may have a spiral shape that can correspond to the path of the flutes 18, similar to the twisted fluid holes 27, 28, 29.

In the embodiment shown in FIGS. 2 and 3, there are a total of six openings 30a, 30b, 32a, 32b, 34a, 34b formed in the three flanks 30, 32, 34 at the forward end 13 of the drill 10. In other words, each connecting fluid hole 26a, 26b, 26c and each twisted fluid hole 27, 28, 29 emerge into its own respective opening. However, it should be appreciated that the invention is not limited by the number of openings in the flanks and that the invention can be practiced with a different number of openings in the flanks.

Figure 4:
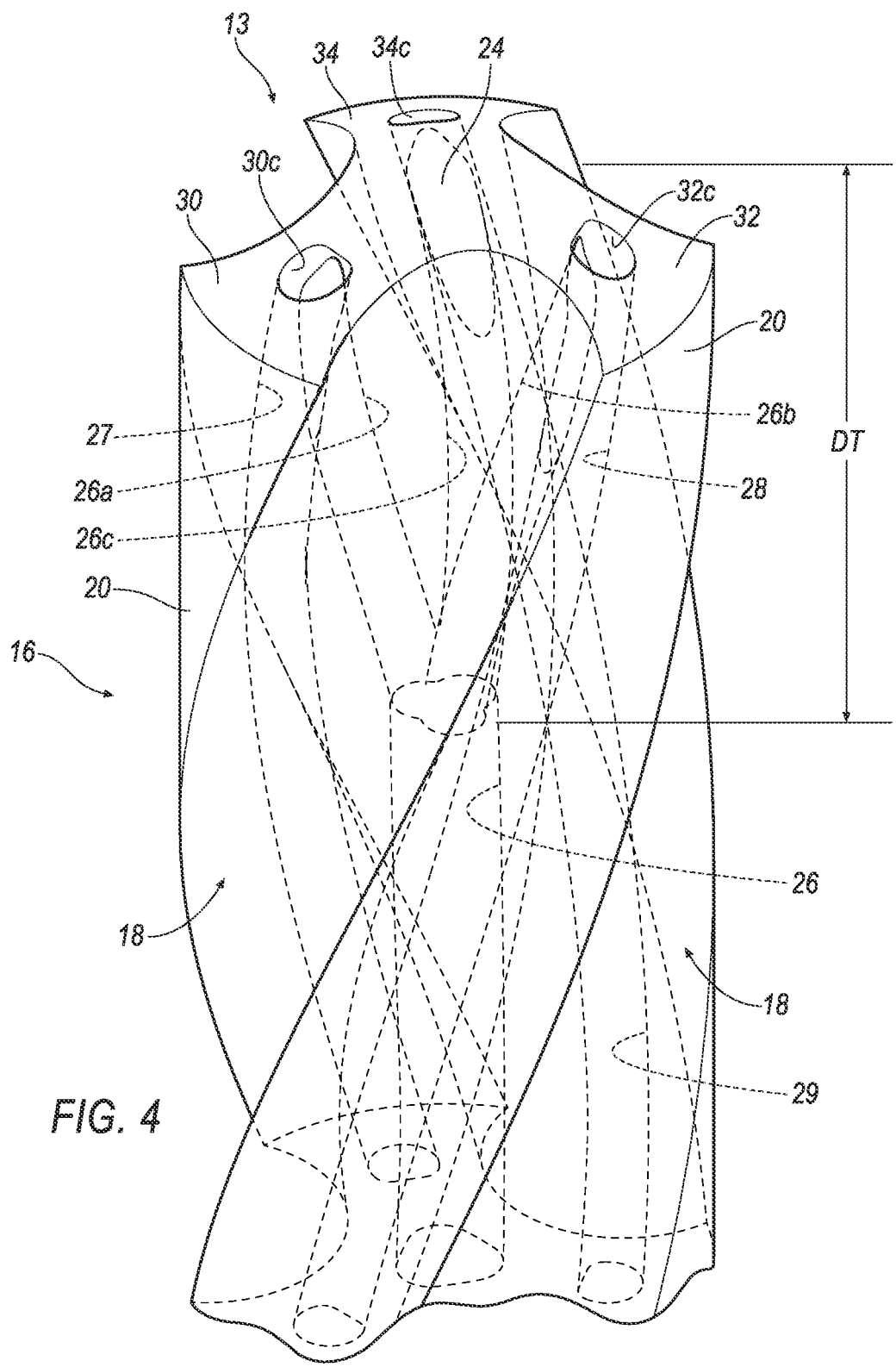
FIG. 4 is a partially enlarged view of another flute portion of the three-flute drill illustrated in FIG. 1 having a total of three openings in the three flank surfaces.

Referring now to FIG. 4, an alternative embodiment of the invention is shown in which the three flanks have a total of three openings 30c, 32c, 34c. Specifically, the connecting fluid hole 26a merges with the twisted fluid hole 27 to emerge into the opening 30c in the flank 30. Similarly, the connecting fluid hole 26b merges with the twisted fluid hole 28 to emerge into the opening 32c in the flank 32. Likewise, the connecting fluid hole 26c merges with the twisted fluid hole 29 to emerge into the opening 34c in the flank 34.

CAE Analysis of Fluid Flow Rate

A CAE analysis of a several variations of a three-flute drill having a drill diameter, D, of about 16 mm was performed. Each variation is described in Table I below. FIGS. 5-9 are cross-sectional views of different variations of the three-flute drill taken along a plane X-X (FIG. 1) orthogonal to the rotational axis, RA, for explaining a cross-sectional shape of the central fluid hole 26 and/or the twisted fluid holes provided in the flute portion 16 of the drill 10. Variations A-E of the drill 10 of the invention are shown in FIGS. 5-9, respectively.

TABLE I

Description of Variations

| Variation | Figure # | Description |
| --- | --- | --- |
| A | 5 | One central circular-shaped hole with a diameter of 3.1 mm and one elongated-shaped hole in each flute |
| B | 6 | One central triangular-shaped hole and one elongated-shaped hole in each flute |
| C | 7 | One central circular-shaped hole with a diameter of 3.1 mm and one circular-shaped hole in each flute with a diameter of 2.0 mm |

TABLE I-continued

Description of Variations

| Variation | Figure # | Description |
| --- | --- | --- |
| D | 8 | One central 2.205 mm diameter hole and one 2.205 mm diameter hole in each flute |
| E | 9 | One central triangular-shaped hole and one semi-circular-shaped hole in each flute |

The results of the CAE analysis are shown in Table II below.

TABLE II

Results

| Variation | Coolant area (mm$^2$) | % A | Body Volume (mm$^3$) | % V | Flow Rate @ 20 bar (kg/s) | % Flow |
| --- | --- | --- | --- | --- | --- | --- |
| Reference | 13.63 | 100.0% | 4715.8 | 100.0% | 0.567 | 100% |
| A | 16.86 | 123.7% | 4554.2 | 96.6% | 0.725 | 128% |
| B | 17.24 | 126.5% | 4534.8 | 96.2% | 0.751 | 132% |
| C | 16.97 | 124.5% | 4548.3 | 96.4% | 0.712 | 125% |
| D | 16.12 | 118.3% | 4591.5 | 97.4% | 0.666 | 117% |
| E | 17.34 | 127.2% | 4531.9 | 96.1% | 0.754 | 133% |

It should be noted that the reference cutting tool (not shown) has one circular-shaped hole in each flute with a diameter of 2.405 mm produced a flow rate of 0.576 kg/s at a pressure of 20 bar and was used as a standard flow rate of 100% for comparing to the Variations A-E of the invention. As stated above, the central fluid hole 26 of the drill 10 of the invention in all the Variations A, B, C and E had a larger cross-sectional area than the twisted fluid holes 27, 28, 29 in each lobe 20, except for Variation D in which all the coolant holes (main, central hole and secondary holes) where circular in cross-sectional shape with the same diameter of about 2.265 mm.

Figure 5:
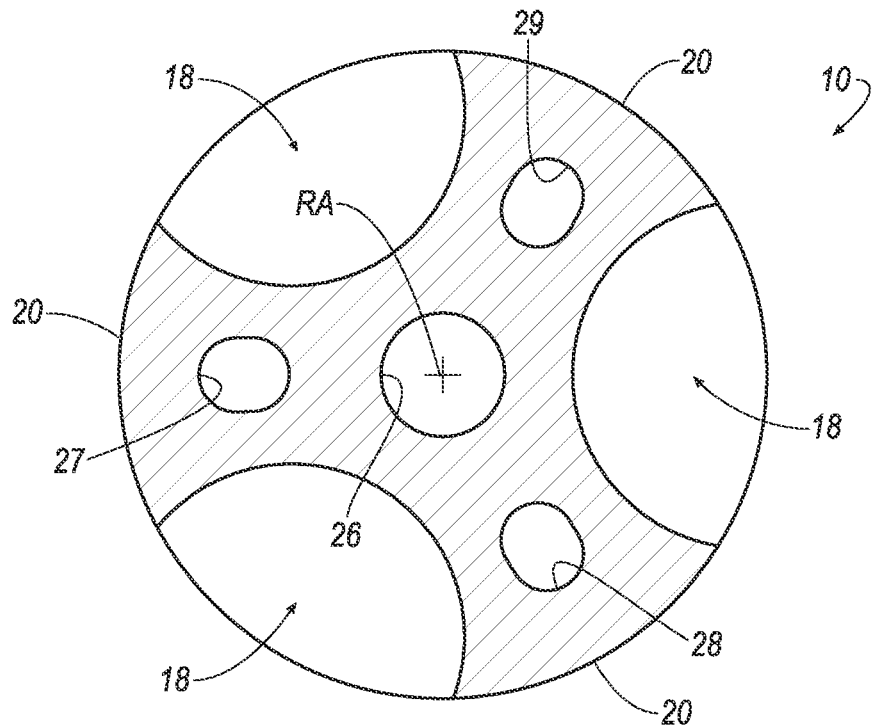
FIG. 5 is a cross-sectional view of a three-flute drill taken along line X-X of FIG. 1 showing the cross-sectional shape of Variation A having a central fluid hole with a circular cross-sectional shape and three twisted fluid holes with a circular cross-sectional shape according to an embodiment of the invention.

As shown in FIG. 5, the three-flute drill 10 of Variation A has a central fluid hole 26 with a circular cross-sectional shape and a diameter of about 3.1 mm and three elongated-shaped (i.e., non-circular) twisted fluid holes 27, 28, 29. It should be noted that the central fluid hole 26 is concentric with the rotational axis, RA. In this example, the drill 10 produced a flow rate of about 0.725 kg/s, which is an increase of about 128% as compared to the flow rate of reference cutting tool.

Figure 6:
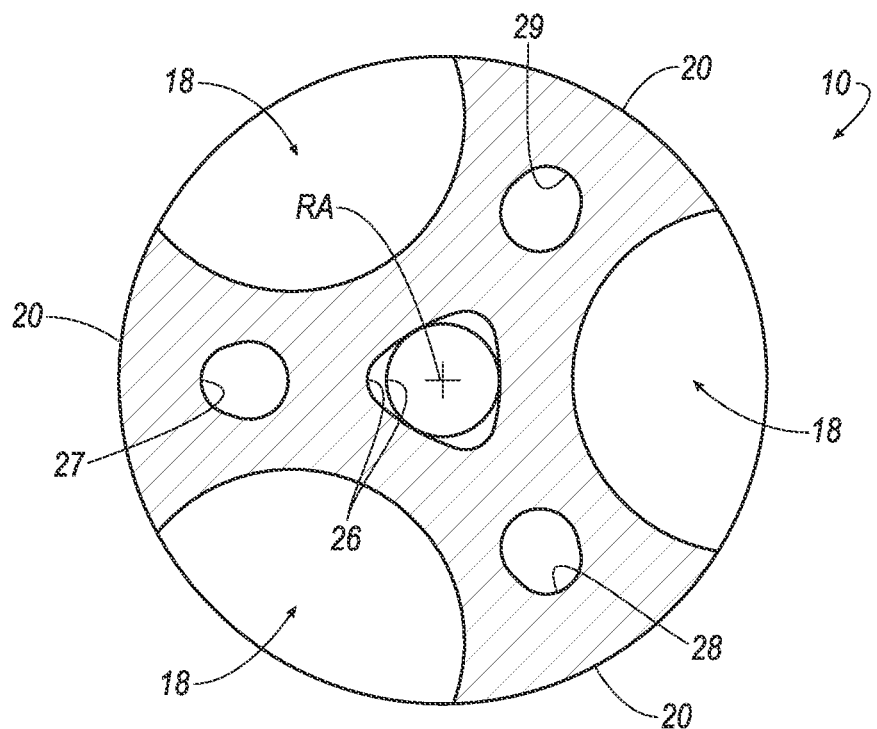
FIG. 6 is a cross-sectional view of a three-flute drill taken along line X-X of FIG. 1 showing the cross-sectional shape of Variation B having a center fluid hole with a triangular cross-sectional shape and three twisted fluid holes with an elongate (i.e., non-circular) cross-sectional shape according to another embodiment of the invention.

As shown in FIG. 6, the three-flute drill 10 of Variation B has a center fluid hole 26 that transitions from a substantially circular cross-sectional shape to a triangular cross-sectional shape and three elongated-shaped (i.e., non-circular) twisted fluid holes 27, 28, 29. The center fluid hole 26 has a larger cross-sectional area than each of the twisted fluid holes 27, 28, 29. It should be noted that the central fluid hole 26 is concentric with the rotational axis, RA. In this example, the drill 10 produced a flow rate of about 0.751 kg/s, which is an increase of about 132% as compared to the flow rate of reference cutting tool, while reducing the volume of the drill body 17 by about 4%.

Figure 7:
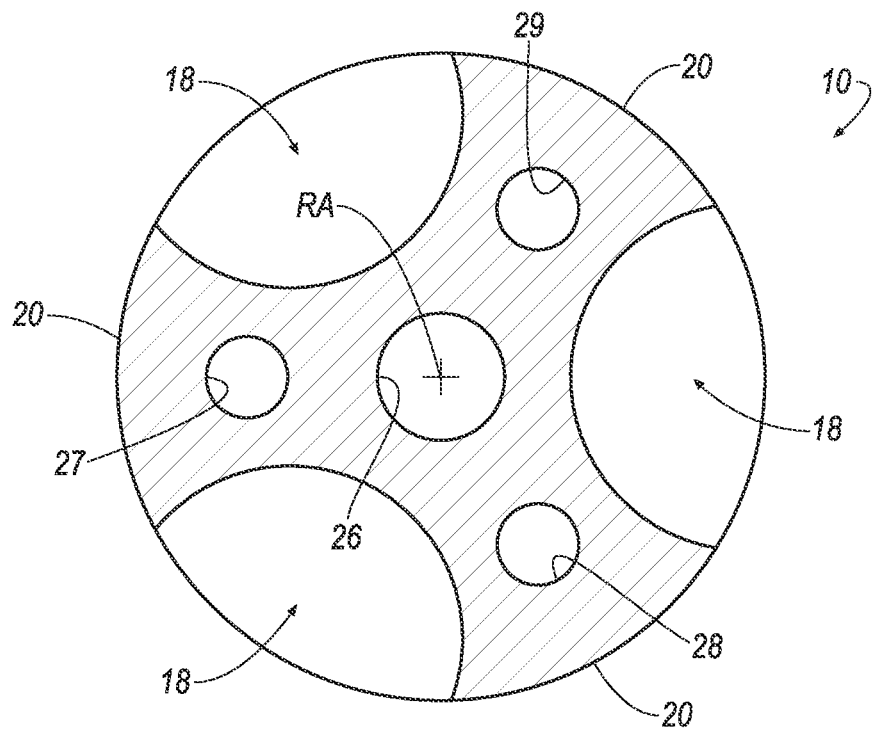
FIG. 7 is a cross-sectional view of a three-flute drill taken along line X-X of FIG. 1 showing the cross-sectional shape of Variation C having a center fluid hole and three twisted fluid holes, all holes with a circular cross-sectional shape and the center fluid hole having a larger diameter than the twisted fluid holes according to another embodiment of the invention.

As shown in FIG. 7, the three-flute drill 10 of Variation C has a center fluid hole 26 with a circular cross-sectional shape and three twisted fluid holes 27, 28, 29 with a circular cross-sectional shape. The center fluid hole 26 has a larger cross-sectional area than each of the twisted fluid holes 27, 28, 29. It should be noted that the central fluid hole 26 is concentric with the rotational axis, RA. In this example, the drill 10 produced a flow rate of about 0.712 kg/s, which is about a 125% increase in the flow rate as compared to reference cutting tool.

Figure 8:
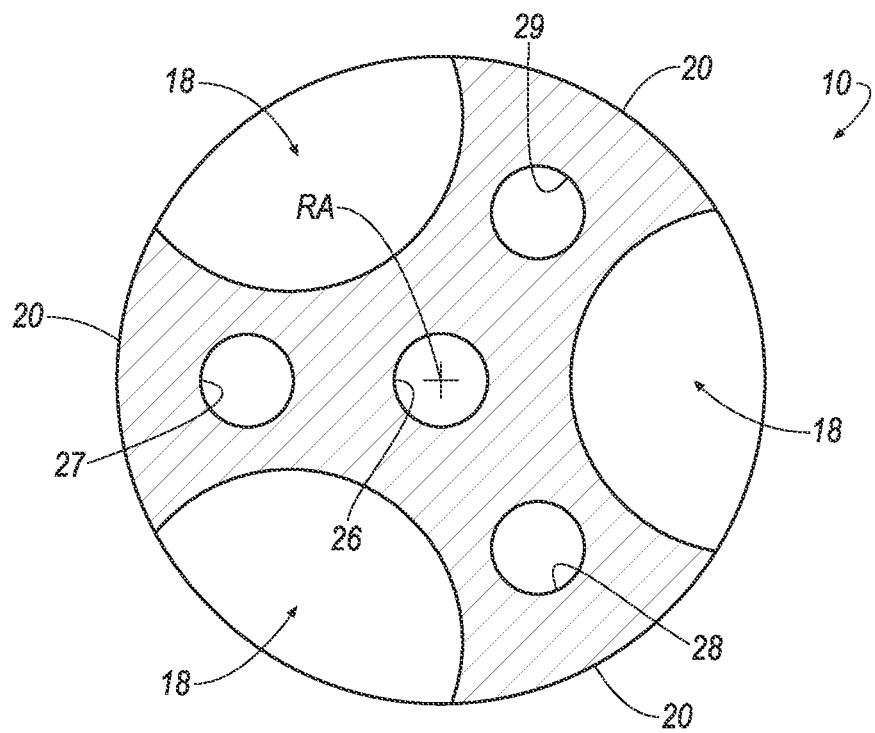
FIG. 8 is a cross-sectional view of a three-flute drill taken along line X-X of FIG. 1 showing the cross-sectional shape of Variation D having a center fluid hole and three twisted fluid holes, all holes with a circular cross-sectional shape and the same diameter according to another embodiment of the invention.

As shown in FIG. 8, the three-flute drill 10 of Variation D has a center fluid hole 26 with a circular cross-sectional shape and three twisted fluid holes 27, 28, 29 with a circular cross-sectional shape. The center fluid hole 26 has a same cross-sectional area than each of the twisted fluid holes 27, 28, 29. It should be noted that the central fluid hole 26 is concentric with the rotational axis, RA. In this example, the drill 10 produced a flow rate of about 0.666 kg/s, which is about a 117% increase in the flow rate as compared to reference cutting tool.

Figure 9:
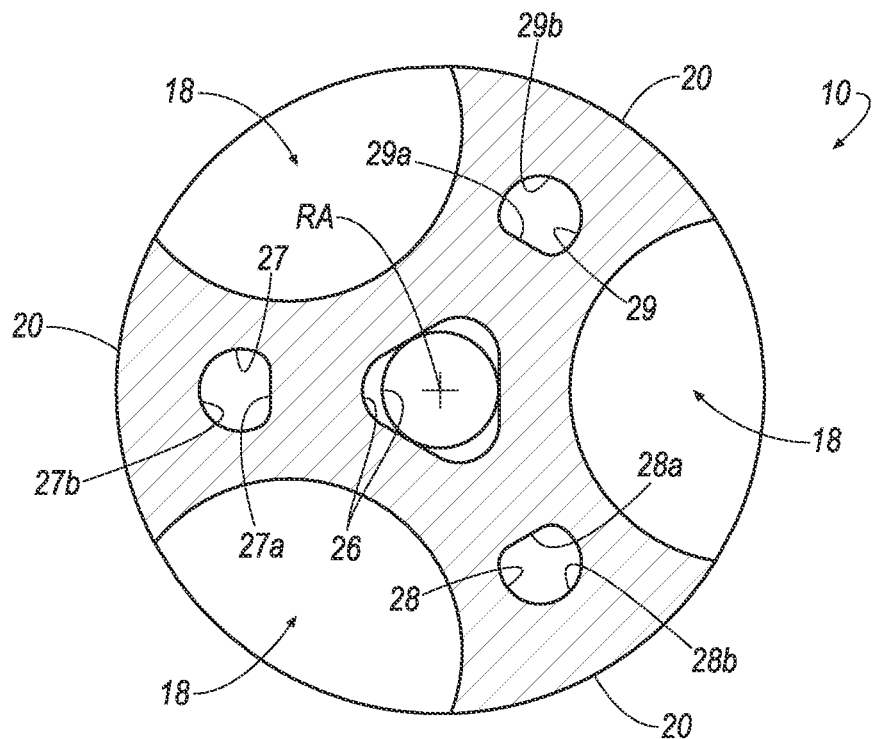
FIG. 9 is a cross-sectional view of a three-flute drill taken along line X-X of FIG. 1 showing the cross-sectional shape of Variation E having a center fluid hole with a triangular cross-sectional shape and three twisted fluid holes with a "D-shaped" (i.e., non-circular) cross-sectional shape according to another embodiment of the invention.

As shown in FIG. 9, the three-flute drill 10 of Variation E has a center fluid hole 26 that transitions from a substantially circular cross-sectional shape to a triangular cross-sectional shape and three twisted fluid holes 27, 28, 29 with a non-circular cross-sectional shape. Specifically, each twisted fluid hole 27, 28, 29 is generally "D-shaped" with a substantially planar wall portion 27a, 28a, 29a and a curved wall portion 27b, 28b, 29b. In this embodiment, each planar wall portion 27a, 28a, 29a is radially inward (i.e. closer to the rotational axis, RA) with respect to each curved wall portion 27b, 28b, 29b. Similar to other variations, the center fluid hole 26 has a larger cross-sectional area than each of the twisted fluid holes 27, 28, 29. It should be noted that the central fluid hole 26 is concentric with the rotational axis, RA. In this example, the drill 10 produced a flow rate of about 0.754 kg/s, which is about a 133% increase in the flow rate as compared to the reference cutting tool. It should be noted that the highest flow rate was produced by the three-flute drill 10 of Variation E.

In summary, all the Variations A-E of the three-flute drill 10 of the invention produced a significantly increased flow rate as compared to the reference cutting tool.

It should be appreciated that the principles of the invention are not limited to the cross-sectional shape variations discussed above, and that the invention can be practiced with the central fluid hole 26 and the twisted fluid holes 27, 28, 29 having other variations of cross-sectional shapes.

Figure 10:
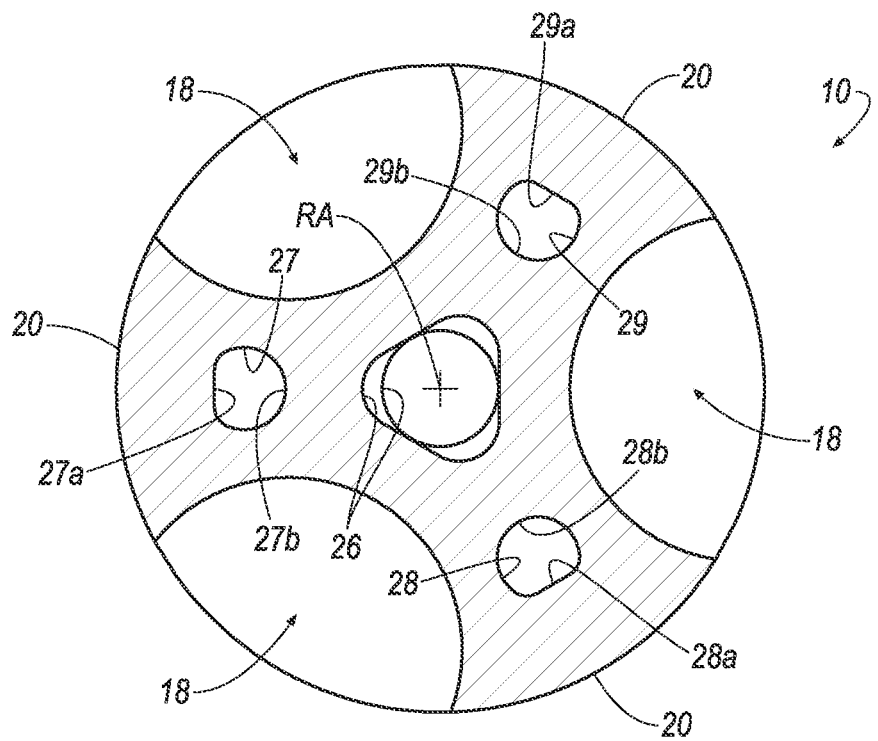
FIG. 10 is a cross-sectional view of a three-flute drill taken along line X-X of FIG. 1 showing the cross-sectional shape of the central fluid hole and the twisted fluid holes of the drill of the invention.

Referring now to FIG. 10, the three-flute drill 10 of the invention is identical to the three-flute drill 10 shown in FIG. 9, except that the twisted fluid holes 27, 28, 29 are rotated 180 degrees with respect to the twisted fluid holes 27, 28, 29 of the three-flute drill 10 shown in FIG. 9.

It should be noted that finite element analysis (FEA) has demonstrated that in overall, the total maximal deformation in the three-flute drill 10 shown in FIG. 9 is smaller (i.e., the torsional stiffness is greater) than that in the three-flute drill 10 shown in FIG. 10 in which the substantially planar wall portions 27a, 28a, 29a are radially outward (i.e. farther away from the rotation axis, RA) than the curved wall portions 27b, 28b, 29b.

Figure 11:
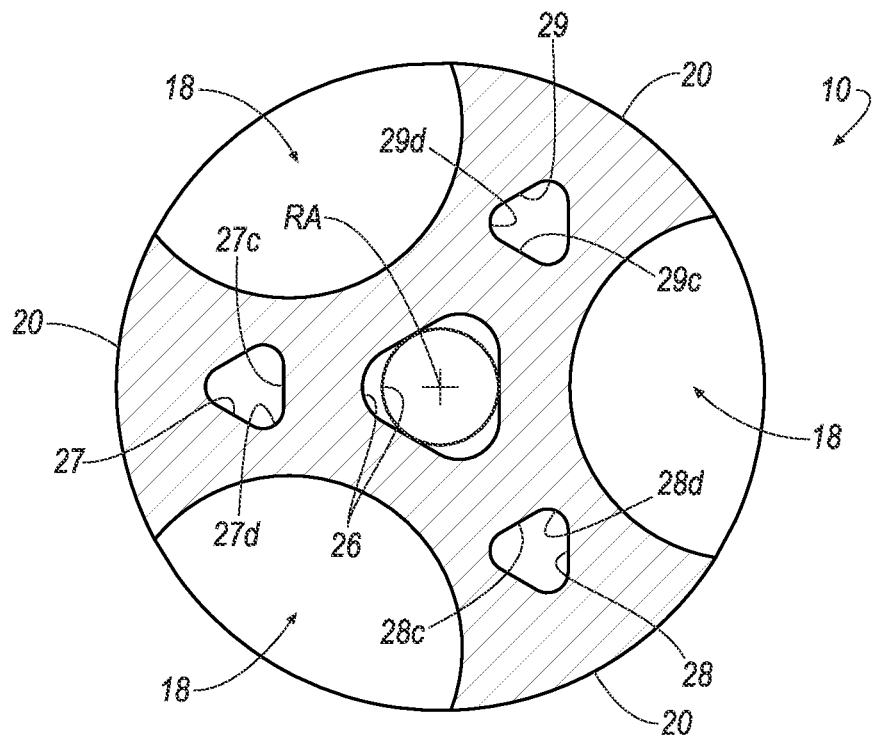
FIG. 11 is a cross-sectional view of a three-flute drill taken along line X-X of FIG. 1 showing the cross-sectional shape of the central fluid hole and the twisted fluid holes of the drill of the invention.

Referring now to FIG. 11, the three-flute drill 10 of the invention can have a central fluid hole 26 that transitions from a substantially circular cross-sectional shape to a triangular cross-sectional shape and three twisted fluid holes 27, 28, 29 having a substantially triangular-shaped cross section. Specifically, each triangular-shaped twisted fluid hole 27, 28, 29 is defined by three side walls 27c, 28c, 29c and three vertices 27d, 28d, 29d. In this embodiment, one of the side walls 27c, 28c, 29c is radially inward (i.e. closer to the rotational axis, RA) with respect to each vertex 27d, 28d, 29d. Similar to other variations, the center fluid hole 26 has a larger cross-sectional area than each of the twisted fluid holes 27, 28, 29. Similar to all other variations, the central fluid hole 26 has a larger cross-sectional area than the twisted fluid holes 27, 28, 29. It should be noted that the central fluid hole 26 is concentric with the rotational axis, RA.

Figure 12:
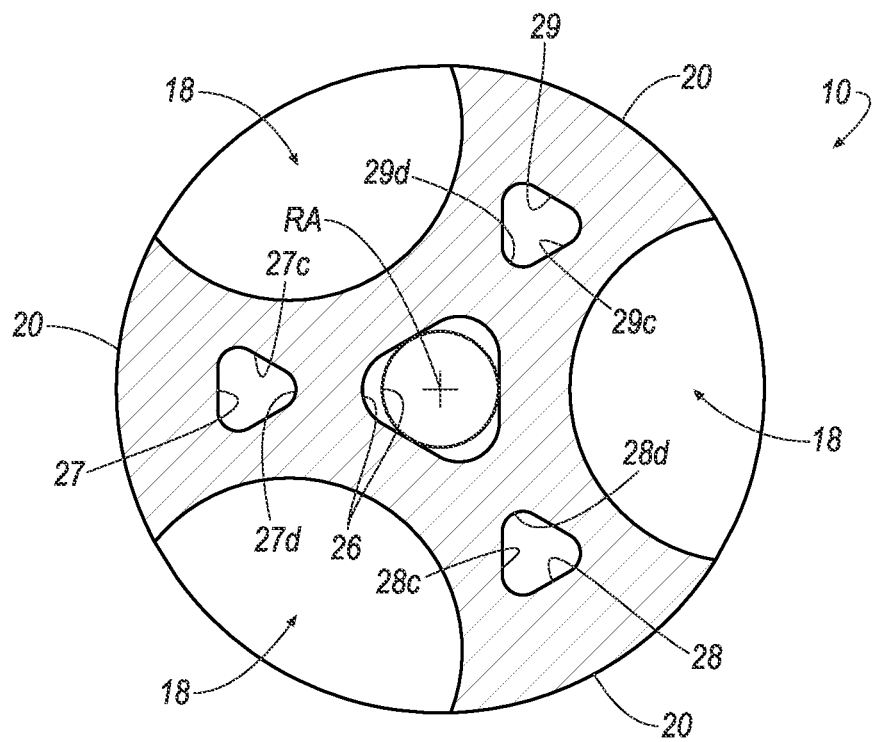
FIG. 12 is a cross-sectional view of a three-flute drill taken along line X-X of FIG. 1 showing the cross-sectional shape of the central fluid hole and the twisted fluid holes of the drill of the invention.
Figure 13:
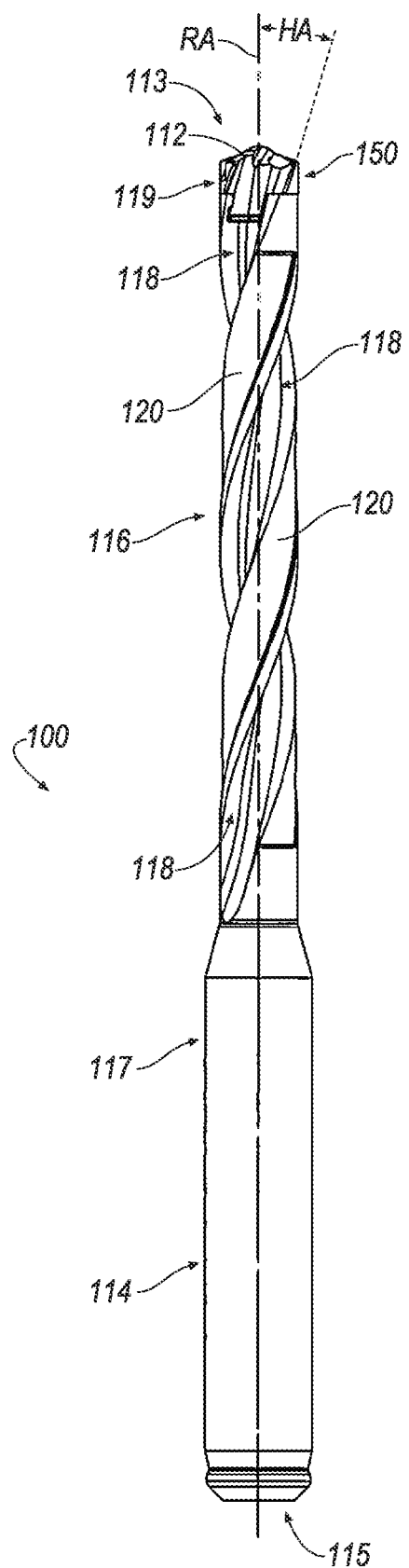
FIG. 13 is a side view of a rotary cutting tool, such as a modular drill with two flutes, according to an embodiment of the invention.

Referring now to FIG. 12, the three-flute drill 10 of the invention is identical to the three-flute drill 10 shown in FIG. 11, except that the twisted fluid holes 27, 28, 29 are rotated 180 degrees with respect to the twisted fluid holes 27, 28, 29 of the three-flute drill 10 shown in FIG. 11.

It should be noted that finite element analysis (FEA) has demonstrated that in overall, the total maximal deformation in the three-flute drill 10 shown in FIG. 11 is smaller (i.e., the torsional stiffness is greater) than that in the three-flute drill 10 shown in FIG. 12 in which the one of the vertices 27d, 28d, 29d is radially inward (i.e., closer to the rotational axis, RA) than each of the side walls 27c, 28c, 29c.

As mentioned above, the shank portion 14 and the flute portion 16 are integral and adjacent to each other in an axial direction of a main body 17. However, it should be appreciated that the principles of the invention can be practiced with a modular drill.

Referring now to FIGS. 13-16, a rotary cutting tool 100, such as a modular drill, for conducting cutting operations on a workpiece (not shown) when the rotary cutting tool 100 is rotated about a central, longitudinal axis, RA, is shown according to an exemplary embodiment of the invention. Like reference numbers for the drill 10 are increased by 100 for the modular drill 100. Thus, although not shown in FIG. 13, the modular drill 100 has a central fluid hole 126 and twisted fluid holes 128a, 128b that are identical to the central fluid hole 26 and twisted fluid holes 27, 28 of the drill 10. Although depicted as a modular drill in the exemplary embodiment described herein, it is to be appreciated that the principles of the invention described herein are applicable to other rotary cutting tools, such as, for example, without limitation, a milling tool, a reamer, a tap, an end mill, and the like.

The rotary cutting tool 100 is generally cylindrical and includes a first or forward end 113 and an opposite, second or rear end 114. The rotary cutting tool 100 has a tool body 117 that includes a pocket portion 119 proximate the first end 113 for securely holding a replaceable cutting insert 150, and a flute portion 116 including a plurality of helical chip flutes 118 separated by lobes 120 extending rearwardly from the first end 113 of the flute portion 116 to the shank portion 114. Similar to the twisted fluid holes 27, 28, 29 in the lobes 20 of the three-flute drill 10, the flute portion 116 has twisted fluid holes 128a, 128b (FIG. 16) in the lobes 120. The tool body 117 also includes a shank portion 114 proximate the second end 115 for mounting the rotary cutting tool 100 in a chuck mechanism of a machine tool (not shown).

In the illustrated embodiment, the rotary cutting tool 100 includes two flutes 118 and two lobes 120. However, it should be appreciated that the invention is not limited by the number of flutes 118 and lobes 120, and that the invention can be practiced with a rotary cutting tool having any desirable number of flutes 118 and lobes 120, such as three, four, five, six, seven, eight, and the like.

Each chip flute 118 allows chips formed by the cutting edges 112 of the rotary cutting tool 100 to exit from the flute portion 116 during a cutting operation. Each chip flute 118 has a helical geometry or pattern and are disposed at a helix angle, HA, relative to the rotational axis, RA. In one embodiment, for example, the helix angle, HA, is at or about 30 degrees (+/−2 degrees). However, it will be appreciated that the invention is not limited by the magnitude of the helix angle, HA, and that the invention can be practiced with any desirable helix angle, HA, in a range between about greater than 0 degrees and about 75 degrees.

Figure 14:
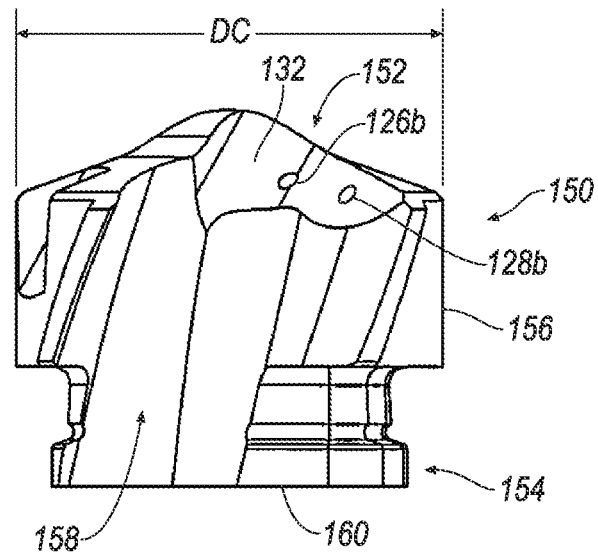
FIG. 14 is a side view of a cutting insert according to an embodiment of the invention.
Figure 15:
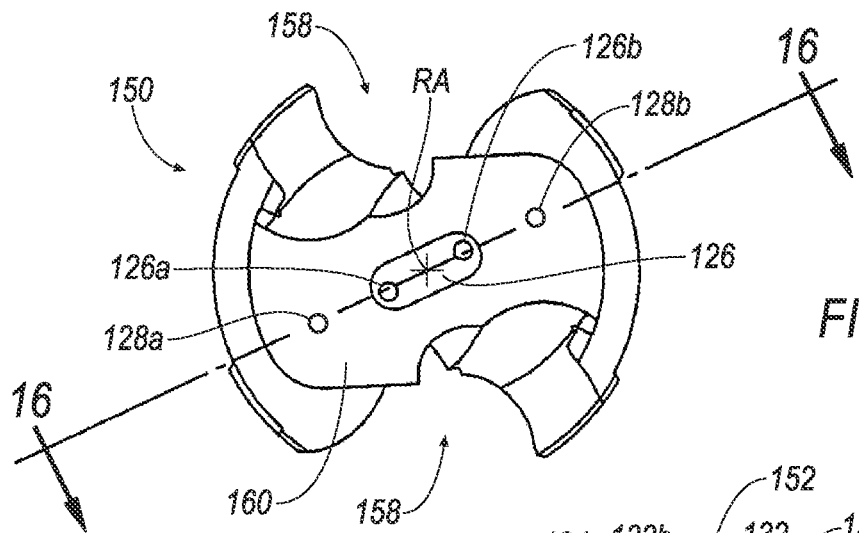
FIG. 15 is a bottom view of the cutting insert of FIG. 14.
Figure 16:
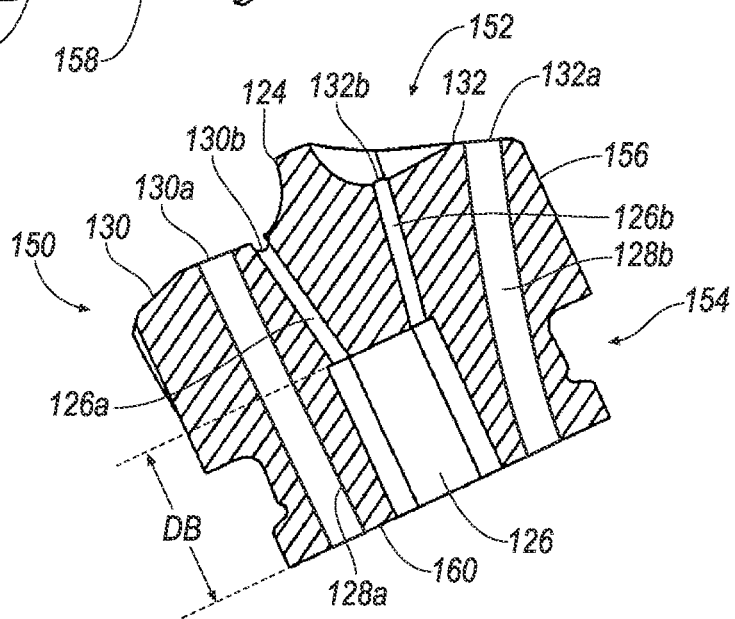
FIG. 16 is a cross-sectional view of the cutting insert taken along line 16-16 of FIG. 15.

Referring now to FIGS. 14-16, the replaceable cutting insert 150 has a front cutting part 152 and a coupling pin 154 extending axially away from the front cutting part 152 (thus, in an axially rearward direction). The front cutting part 152 of the cutting insert 150 defines a cutting diameter, DC. On its circumference, the cutting insert 150 has an outer peripheral surface 156 that is interrupted by opposite-facing flutes 158 that start in the cutting insert 150 and continuously merge into the helical flutes 118 disposed in the flute portion 116 of the main body 117.

In the exemplary embodiment, the flutes 158 are substantially helical in shape. The coupling pin 154 of the cutting insert 150 extends in the axial rearward direction with respect to the front cutting part 152. The coupling pin 154 is offset in a radially inward direction from the outer peripheral surface 156. The replaceable cutting insert 150 also includes a base surface 160 with a central fluid hole 126 in fluid communication with the central fluid hole 26 (not shown in FIG. 13) in the flute portion 116 of the main body 117 for providing fluid to the cutting edges 112 of the cutting insert 150. In the illustrated embodiment, the fluid opening 126 may have an identical or different cross-sectional shape as the central fluid hole 126 in the flute portion 116 of the main body 117 to provide increased flow rate to the cutting edges, as compared to conventional cutting inserts with a circular cross-sectional shape.

The central fluid hole 126 of the drill 100 extends along the rotational axis, RA, from the rearward end 115 of the drill 100, through the entire shank portion 114, and through the entire flute portion 116 and into the pocket portion 119 a predetermined distance, DB. As shown in FIG. 16, the central fluid hole 126 branches or splits at the predetermined distance, DB, from the base surface 160 into one or more connecting fluid holes 126a, 126b.

In one embodiment, the total number of connecting fluid holes 126a, 126b corresponds to the total number of flutes 118. Thus, in the illustrated embodiment, there are a total of two connecting fluid holes 126a, 126b. The connecting fluid holes 126a, 126b can have any desirable cross-sectional shape, such as circular, non-circular, polygonal, and the like.

Referring now to FIG. 16, the fluid can also be supplied through the one or more twisted fluid holes 128a, 128b. In one embodiment, the total number of twisted fluid holes 128a, 128b corresponds to the total number of flutes 118. Thus, in the illustrated embodiment, there are a total of two twisted fluid holes 128a, 128b. Each twisted fluid hole 128a, 128b has a spiral shape that can correspond to the path of the flutes 118. In addition, each twisted fluid hole 128a, 128b emerges in an opening (not shown) in the rearward end 115 of the drill 100 in fluid communication with a pressurized source of fluid (not shown).

As shown in FIG. 16, the cutting insert 150 includes two flanks 130 and 132. In the illustrated embodiment of FIG. 8, each of the connecting fluid holes 126a, 126b and each of the twisted fluid holes 128a, 128b emerges in an opening in each flank 130, 132. Specifically, the twisted fluid holes 128a, 128b emerge into openings 130a, 132a in the flanks 130, 132, respectively. Similarly, connecting fluid holes 126a, 126b emerge into openings 130b, 132b in the flanks 130, 132, respectively.

Each connecting fluid hole 126a, 126b may extend in a linear fashion from the central fluid hole 126 of the cutting insert 150 to its respective opening 130b, 132b. Alternatively, the connecting fluid holes 126a, 126b may have a spiral shape that can correspond to the path of the flutes 118, similar to the twisted fluid holes 128a, 128b.

In the embodiment shown in FIGS. 14-16, there are a total of four openings 130a, 130b, 132a, 132b formed in the flanks 130, 132 of the cutting insert 150. In other words, each connecting fluid hole 126a, 126b and each twisted fluid hole 128a, 128b emerge into a respective opening. However, it should be appreciated that the invention is not limited by the number of openings in the flanks and that the invention can be practiced with a different number of openings in the flanks. Similar to the embodiment shown in FIG. 3, for example, the connecting fluid hole 126a may merge with the twisted fluid hole 128a and emerge in a single opening in the flank 130 of the cutting insert 150. Likewise, the connecting fluid hole 126b may merge with the twisted fluid hole 128b and emerge in a single opening in the flank 132 of the cutting insert 150.

In each of the drills 10, 100 of the invention, the total length of the central fluid hole 26, 126 is larger in cross-sectional area than each of the connecting fluid holes 26a, 26b, 26c, 126a, 126b and the twisted fluid holes 27, 28, 29, 128a, 128b and is equal to at least 60% of the total length of each flute 18, 118 of the drill 10, 100. In addition, the length of the central fluid hole 26, 126 and the length of the connecting fluid holes 26a, 26b, 26c, 126a, 126b is in a range between about 60% and 90% of the total length of each flute 18, 118.

As described above, a drill 10, 100 of the invention delivers fluid in an efficient manner to the interface between the cutting tool and the workpiece without significantly altering the performance and properties, such as torsional stiffness, and the like, of the drill 10, 100, as compared to conventional drills.

The patents and publications referred to herein are hereby incorporated by reference.

Having described presently preferred embodiments the invention may be otherwise embodied within the scope of the appended claims.

What is claimed is:

1. A rotary cutting tool, comprising:
    a tool body including a shank portion proximate a rearward end of the rotary cutting tool, a flute portion integral and adjacent the shank portion in an axial direction of the tool body, and a pocket portion proximate a forward end of the rotary cutting tool, the flute portion having a plurality of flutes separated by lobes;
    a replaceable cutting insert mounted in the pocket portion of the tool body, the replaceable cutting insert has an outer peripheral surface interrupted by a plurality of flutes that continuously merge into the plurality of flutes of the flute portion of the tool body;
    a central fluid hole extending along a central, rotational axis, RA, from the rearward end, entirely through the shank portion of the tool body, entirely through the flute portion of the tool body, and partially into the cutting insert, the central fluid hole terminating in the cutting insert at a predetermined distance, DB, from a base surface of the cutting insert;
    one or more connecting fluid holes in fluid communication with the central fluid hole, the one or more connecting fluid holes extending from the central fluid hole at the predetermined distance, DB, from the base of the cutting insert and terminating in a first opening in a flank of the cutting insert for supplying fluid to one or more cutting edges of the cutting insert; and
    one or more twisted fluid holes extending from the rearward end of the tool body, entirely through the shank portion, entirely through a lobe in the flute portion, entirely through the cutting insert, and terminating in a second opening in the flank of the cutting insert for supplying fluid to one or more cutting edges of the cutting insert, wherein at least a portion of the central fluid hole has a triangular cross-sectional shape when viewed in a plane perpendicular to the central, rotational axis, RA, and wherein the one or more twisted fluid holes has a different cross-sectional shape than the central fluid hole.

2. The rotary cutting tool of claim 1, wherein the plurality of flutes of the flute portion are formed with a helix angle, HA, with respect to a center rotational axis, RA, of the rotary cutting tool.

3. The rotary cutting tool of claim 1, wherein the one or more twisted fluid holes are "D-shaped" in cross section having a planar wall portion and a curved wall portion.

4. The rotary cutting tool of claim 3, wherein the planar wall portion is radially inward with respect to the curved wall portion.

5. The rotary cutting tool of claim 3, wherein the planar wall portion is radially outward with respect to the curved wall portion.

6. The rotary cutting tool of claim 1, wherein the rotary cutting tool comprises a modular drill.

7. The rotary cutting tool of claim 1, wherein the replaceable cutting insert has a front cutting part defining a cutting diameter, DC, and a coupling pin extending axially away from the front cutting part.

8. The rotary cutting tool of claim 1, wherein the plurality of flutes of the cutting insert continuously merge into the plurality of flutes of the flute portion.

9. The rotary cutting tool of claim 1, wherein a cross-sectional area of the central fluid hole is larger than a cross-sectional area of the one or more twisted fluid holes.

10. The rotary cutting tool of claim 1, wherein the central fluid hole transitions from a circular cross-sectional shape to the triangular cross-sectional shape.

\* \* \* \* \*